UNITED STATES PATENT OFFICE.

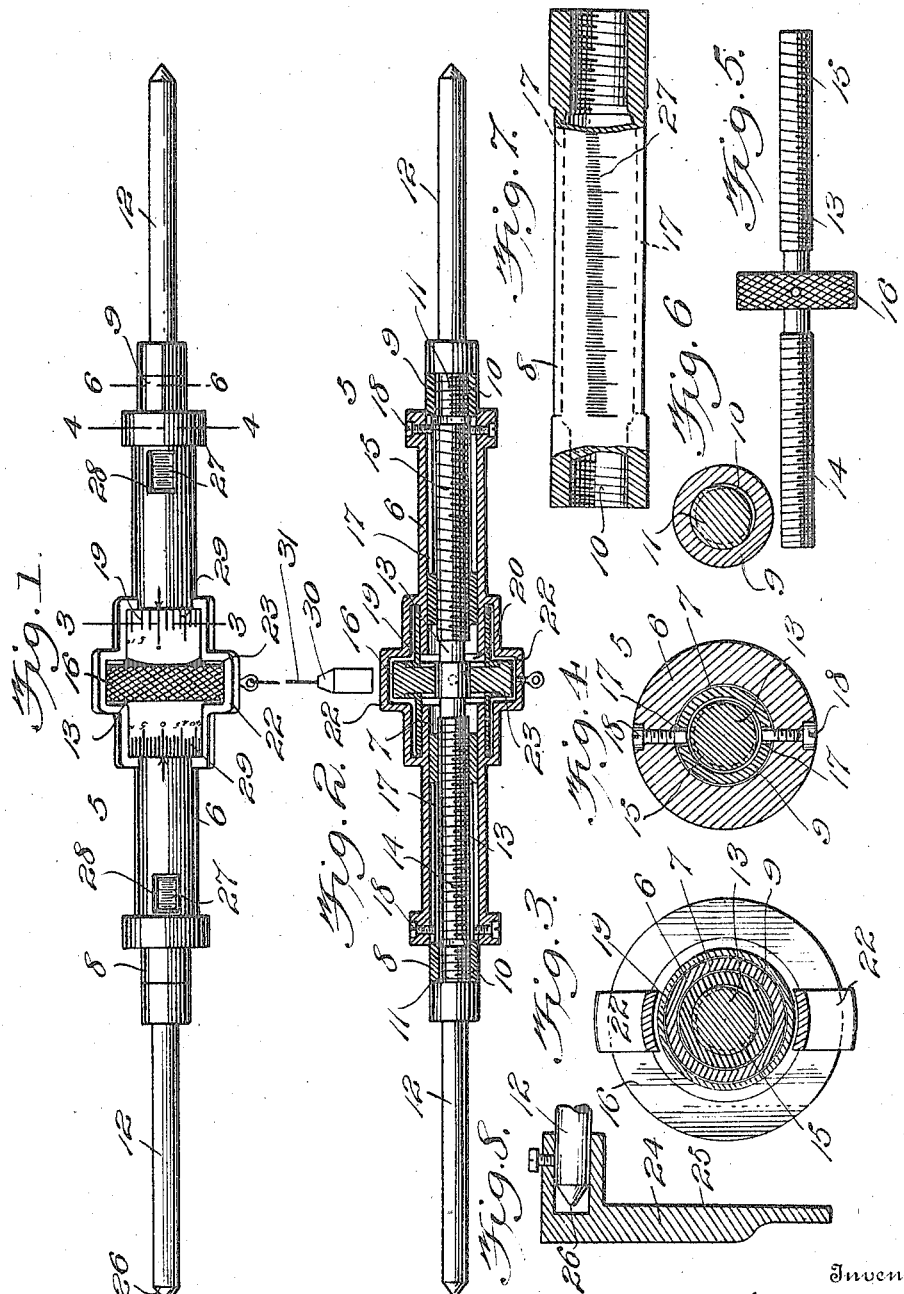

EMERICK WESTER, OF PHILADELPHIA, PENNSYLVANIA.

MICROMETER.

1,267,946.

Specification of Letters Patent.   Patented May 28, 1918.

Application filed August 28, 1916. Serial No. 117,340.

*To all whom it may concern:*

Be it known that I, EMERICK WESTER, a citizen of the United States, residing at Philadelphia, in the county of Philadelphia and State of Pennsylvania, have invented new and useful Improvements in Micrometers, of which the following is a specification.

This invention relates to metrological instruments, and has particular reference to micrometers of the type employed in measuring very small lengths and wherein a high degree of accuracy is required to make a measurement.

An object of the invention is to provide a micrometer embodying novel means for enabling the operator thereof to produce a measurement as fine as one thousandth of an inch or an equivalent by a simple manipulation of the controlling screw of the micrometer.

Further objects of the invention reside in a micrometer of simplified and improved construction which will perform the functions assigned to the same in an efficient and accurate manner, the invention being of such construction as to be readily adjusted to meet requirements of work having various dimensions and to be readily adjusted to suit such requirements; the device also provides mechanism whereby distances may be accurately ascertained or transferred.

To this end the invention comprises, among other features, a plurality of expansible and contractible measuring elements, the movement of which being uniformly controlled upon the rotation of an adjusting screw and means being provided in coöperation with said members to enable the operator of the micrometer to readily determine and control the movement of the measuring elements.

With these and other objects in view, the invention consists of certain novel features of construction, and arrangement of parts as will be more fully hereinafter described and pointed out in the claims.

In the accompanying drawing, wherein the preferred form of the present invention has been illustrated, Figure 1 is a side elevation of the micrometer, Fig. 2 is a vertical longitudinal, sectional view taken through the same, Fig. 3 is a transverse sectional view taken on the line 3—3 of Fig. 1, Fig. 4 is a similar view taken on the line 4—4 of Fig. 1, Fig. 5 is a detail view of the adjusting screw, Fig. 6 is a transverse section on the line 6—6 of Fig. 1, Fig. 7 is a side elevation, parts being shown in section, of one of the sliding scale tubes, and Fig. 8 is a detail view disclosing the bracket employed by the micrometer when outside measurements are being determined.

Similar characters of reference denote corresponding parts in all the views of the drawing.

Referring more particularly to the drawing, the numeral 5 designates the micrometer in its entirety, the same consisting of an outer casing 6 having an internal bore 7 in which are positioned sliding scale tubes 8 and 9. Said tubes are formed with internal threads 10, adjacent the outer extremities thereof, to receive the threaded extremities 11 of end members 12. The scale tubes are further provided with internal threads adjacent the inner extremities thereof for coöperation with an adjusting screw 13. The screw 13 consists of threaded rods 14 and 15, the rod 14 being provided with right handed threads while the rod 15 is cut to provide left handed threads, and said threaded rods are adapted to engage with the similarly threaded extremities 11 of the sliding scale tubes 8. The screw 13 has rigidly secured thereto a manipulating knurled wheel 16, so that upon the rotation of the latter a rotary movement will be imparted to the adjusting screw, as will be obvious. Thus it will be seen that the rotation of the screw 13 will result in expanding or contracting the sliding tubes 8, in accordance to the direction of rotation of said adjusting screw.

In order to prevent the scale tubes 8 from rotating in unison with the adjusting screw, the tubes are provided with elongated slots 17 into which are inserted set screws 18, or their equivalent, which are threaded into the outer casing 6. The latter, of course, will be held in the hand of the operator when the micrometer is being used and will therefore be non-rotatable.

The adjusting screw 13 is held within its operative position within the micrometer by providing the same with a tubular member 19 which is rigidly secured to the manipulating wheel 16. The tubular member surrounds the central portion of the outer casing 6, which is cut away as at 20 to expose the wheel 16, so that the latter may be operated. Guide and connecting webs 22 are integrally formed with the casing 20 and are provided with guide openings 23 to receive the wheel 16 and the tubular member 19 thereof, so that the adjusting screw 13 will be accurately journaled upon the casing 6.

The end members 12 of the micrometer are made removable from the scale tubes 8 so that other end members of varying length may be readily connected with the tubes 8, as will be readily understood. When the micrometer is employed in making inside measurements, such as determining the diameter of the bore of a cylinder, it will be in substantially the same form as disclosed in Fig. 1, but when the same is used to ascertain outside dimensions, the bracket 24, as shown in Fig. 8, is clamped or otherwise secured to the outer extremities of the end members, so that the micrometer may be conveniently used to perform with accuracy such outside measurements. It will be noted that the work engaging surface 25 of the bracket 24, when in position upon the end members 12 will be in exact alinement with the ends 26 of said end members, in order that the accuracy of the micrometer will be identical when the same is performing inside or outside measurements.

The adjusting screw 13 has the threaded rods 14 and 15 thereof preferably provided with threads numbering forty to an inch, which of course, engage with similar threads formed in the scale tubes 8. Thus it will be observed that upon rotating the adjusting screw a complete revolution, each scale tube will be moved twenty-five thousandths of an inch, or in other words, the extremities of the end members 12 will be separated or moved together fifty thousandths of an inch, and if the adjusting screw 13 is rotated but one fiftieth of its complete orbit the movement imparted to the end members will be equal to one thousandth of an inch, as will be clearly understood, although of course, deviations may be made in the above figures without departing from the principle of the invention.

In order to record or indicate the movement of the end members, the scale tubes 8 are provided with scale indications 27, which preferably include forty marks to an inch, the space between each mark representing twenty-five thousandths of an inch. The scale may be read through side openings 28 formed in the outer casing 6, which will indicate the movement of the scale tube. The movement or the degree of rotation of the adjusting screw 13 may be also determined by providing the tubular member 19 with suitable scale indications 29, which consist of fifty equally spaced marks disposed around the circumference of the tubular member, which enable the operator of the micrometer to readily determine the degree of rotation of the adjusting screw 13.

From the foregoing, it will be apparent that all of the objects of the present invention have been achieved, and that all the advantageous features above mentioned, among others, are present. The micrometer is of simple construction, reliable, durable and accurate in operation when subjected to continuous service, and may be economically manufactured. From the above description it is thought that the operation and construction of the invention will be clearly understood and a more extended explanation has, therefore, been omitted.

In order that the operator of the micrometer may readily know when the same is in a true horizontal position, the casing 6 is provided with a plumb attachment 30, which is suspended from the micrometer by means of a cable or the like 31. The use of the plumb attachment, however, is optional as many skilled mechanics do not require the services thereof.

What is claimed as new and patentable is:—

1. A micrometer embodying an outer casing having sight openings, slidable hollow scale tubes supported within said casing, an adjusting screw threadedly connected with said casing whereby the rotation of said screw will extend or withdraw the outer extremities of said slidable tubes with respect to said casing.

2. A micrometer embodying an outer casing having sight openings, slidable hollow scale tubes supported within said casing, an adjusting screw threadedly connected with said casing whereby the rotation of said screw will extend or withdraw the outer extremities of said slidable tubes with respect to said casing, and means formed integral with the casing for accurately journaling the adjusting screw thereon.

3. A micrometer embodying a casing, adjustable slotted measuring elements slidably mounted within said casing, an adjusting member operating with said measuring elements to extend or withdraw the latter with respect to said casing, means for determining the degree of rotation of the adjusting member, and means protruding through the slot of the measuring elements for preventing the latter and adjusting member from rotating in unison.

4. A micrometer embodying a casing, adjustable measuring elements slidably mounted within said casing, a tubular member embracing said casing, an adjusting member carried by the tubular member and coöperating with the said measuring elements to extend or withdraw the latter with respect to said casing and means for preventing a simultaneous rotation of the measuring elements and adjusting member.

5. A micrometer embodying a casing, adjustable measuring elements slidably mounted within said casing, a tubular member embracing said casing, an adjusting member carried by the tubular member and coöperating with the said measuring elements to extend or withdraw the latter with respect to said casing, and a web formed on the said casing for accurately journaling the adjusting member thereon.

6. A micrometer embodying a casing, adjustable measuring elements slidably mounted within said casing, a tubular member embracing said casing, an adjusting member carried by the tubular member and coöperating with the said measuring elements to extend or withdraw the latter with respect to said casing, and a scale on the tubular member for determining the degree of rotation of the adjusting member.

7. A micrometer embodying adjustable measuring elements, said elements being provided with right and left handed threads, an adjusting screw formed with right and left handed threaded portions adapted to coöperate with the threads of said measuring elements, removable end members connected with said measuring elements, means provided by said casing to prevent the measuring elements from rotating but to permit of their reciprocating movement, scale indications provided on said measuring elements and adapted to register with side openings formed in said casing and a scale carrying member rotatable with said adjusting screw to determine the degree of rotation of the latter.

In testimony whereof I affix my signature in presence of two witnesses.

EMERICK WESTER.

Witnesses:
CHARLES G. GARTLING.
S. ROSNER.

Copies of this patent may be obtained for five cents each, by addressing the "Commissioner of Patents, Washington, D. C."